United States Patent [19]

Coad

[11] Patent Number: 4,517,157

[45] Date of Patent: May 14, 1985

[54] COPPER BASED BRAZING ALLOY

[75] Inventor: Brian C. Coad, San Francisco, Calif.

[73] Assignee: GTE Products Corporation, Stamford, Conn.

[21] Appl. No.: 659,811

[22] Filed: Oct. 11, 1984

[51] Int. Cl.$^3$ .............................................. C22C 9/10
[52] U.S. Cl. ................................. 420/490; 228/263.15
[58] Field of Search ............................... 420/469, 490; 228/263.15, 263.18; 428/677; 148/403

[56] References Cited

U.S. PATENT DOCUMENTS

| | | | |
|---|---|---|---|
| 2,058,886 | 10/1936 | Jennison | 228/263.18 |
| 4,448,852 | 5/1984 | Bose et al. | 148/403 |
| 4,448,853 | 5/1984 | Fischer et al. | 148/403 |

Primary Examiner—Peter K. Skiff
Attorney, Agent, or Firm—Donald R. Castle

[57] ABSTRACT

A brazing alloy having a composition consisting essentially of from about 1% to about 3% by weight boron, from about 8% to about 12% by weight silicon, and the balance copper is beneficial in brazing stainless steels and other ferrous metals.

3 Claims, No Drawings

COPPER BASED BRAZING ALLOY

FIELD OF THE INVENTION

This invention relates to a brazing alloy consisting essentially of boron, silicon, and copper.

BACKGROUND OF THE INVENTION

Copper based brazing alloys of essentially pure copper or copper and zinc, with melting ranges of from about 866° C. to about 1082° C. are used to braze ferrous alloy components. However, pure copper wets such components only under carefully controlled brazing conditions. The presence of zinc augments wetting, and also lowers the brazing temperature, but the high vapor pressure of zinc presents problems in many applications.

Copper-phosphorus brazing alloys with liquidus temperatures in the range of from about 718° C. to about 924° C. are also widely used. The phosphorus, besides lowering the brazing temperature and improving wetting characteristics, imparts a self-fluxing characteristic to the alloys under oxidizing conditions. However, because of the deleterious effect of phosphorus on ferrous alloys, the copper-phosphorus alloys are restricted in use to the brazing of non-ferrous components, and cannot be used to braze stainless steels.

Therefore, an alloy suitable for brazing ferrous components without the problems brought about by incomplete wetting and by high vapor pressure material would be an advancement in the art.

SUMMARY OF THE INVENTION

In accordance with one aspect of this invention there is provided a brazing alloy having a composition consisting essentially of from about 1% to about 3% by weight boron, from about 8% to about 12% by weight silicon, and the balance copper.

DETAILED DESCRIPTION OF THE INVENTION

This invention relates to a brazing alloy consisting essentially of boron, silicon, and copper.

The composition of the alloy consists essentially of from about 1% to about 3% by weight boron, from about 8% to about 12% by weight silicon, and the balance copper. A preferred composition consists essentially of from about 1.5% to about 2.5% by weight boron, from about 9% to about 11% by weight silicon, and the balance copper. An especially preferred composition consists essentially of about 1.8% to 2.2% by weight boron, about 9.5% to 10% by weight silicon, and the balance copper. Alloys containing about 10% by weight silicon melt in a temperature range similar to that of copper-phosphorus alloys, that is, from about 718° C. to about 924° C. The addition of about 2% by weight boron improves wetting of such alloys, and to a degree imparts a self fluxing characteristic.

The low vapor pressure of the alloys of the invention constitutes an improvement over the copper-zinc alloys. The good wetting characteristics are an improvement over pure copper. These alloys are compatible with stainless steel substrates such as 410 stainless. This compatibility is an improvement over the copper-phosphorus alloys.

The composition of 410 stainless is about 19% by weight chromium, about 18.5% iron, about 3% molybdenum, about 0.18% manganese, about 0.5% aluminum, about 0.9% titanium, about 5.13% cobalt and tantalum, about 0.18% silicon, about 0.04% carbon, and the balance nickel. An alloy of about 2% boron, about 10% silicon and the balance copper, having a liquidus of about 832° C. is used in brazing stainless 410 showing excellent wetting and flow.

While there has been shown and described what are at present considered the preferred embodiments of the invention, it will be obvious to those skilled in the art that various changes and modifications may be made therein without departing from the scope of the invention as defined by the appended claims.

What is claimed is:

1. A brazing alloy having a composition consisting essentially of from about 1 to about 3% by weight boron, from about 8% to about 12% by weight silicon, and the balance copper.

2. A brazing alloy according to claim 1 wherein the composition consists essentially of from about 1.5% to about 2.5% by weight boron, from about 9% to 11% by weight silicon and the balance copper.

3. A brazing alloy according to claim 2 wherein the composition consists essentially from about 1.8% to about 2.2% by weight of boron, from about 9.5% to about 10.5% by weight of silicon and the balance copper.

* * * * *